United States Patent
Altan et al.

(10) Patent No.: US 7,714,701 B2
(45) Date of Patent: May 11, 2010

(54) ACTIVE MATERIAL BASED HAPTIC ALERT SYSTEM

(75) Inventors: Osman D. Altan, Northville, MI (US); Alan L. Browne, Grosse Pointe, MI (US); Nancy L. Johnson, Northville, MI (US); Brian S. Repa, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 217 days.

(21) Appl. No.: 11/554,110

(22) Filed: Oct. 30, 2006

(65) Prior Publication Data

US 2007/0109104 A1 May 17, 2007

Related U.S. Application Data

(60) Provisional application No. 60/737,202, filed on Nov. 16, 2005.

(51) Int. Cl.
*H04B 3/36* (2006.01)

(52) U.S. Cl. .................. 340/407.1; 340/435; 340/576

(58) Field of Classification Search ............... 340/576, 340/575, 573.1, 539.1, 435, 407.1; 601/57, 601/49, 86–98; 600/549
See application file for complete search history.

(56) References Cited

U.S. PATENT DOCUMENTS

| | | | |
|---|---|---|---|
| 4,484,191 A | 11/1984 | Vavra | 340/965 |
| 6,812,833 B2 * | 11/2004 | Rothkop et al. | 340/475 |
| 7,187,274 B2 * | 3/2007 | Clark | 340/457 |
| 7,245,231 B2 * | 7/2007 | Kiefer et al. | 340/903 |
| 2002/0145512 A1 | 10/2002 | Sleichter et al. | 340/407.1 |
| 2003/0229447 A1 | 12/2003 | Wheatley et al. | 701/301 |
| 2004/0049323 A1 | 3/2004 | Tijerina et al. | 701/1 |
| 2005/0075770 A1 | 4/2005 | Taylor et al. | 701/36 |

* cited by examiner

*Primary Examiner*—Anh V La

(57) ABSTRACT

A haptic alert system generally includes an active material based actuator for providing the haptic alert. The active material based actuators refer to the use of several different classes of active materials all of which exhibit a change in at least one attribute such as dimension, shape, and/or flexural modulus when subjected to at least one of many different types of applied activation signals, examples of such signals being thermal, electrical, magnetic, stress, and the like.

13 Claims, 3 Drawing Sheets

ACTIVE MATERIAL BASED HAPTIC ALERT SYSTEM

CROSS REFERENCE TO RELATED APPLICATIONS

The present application relates to and claims the benefit of priority to U.S. Provisional Application No. 60/737,202 filed Nov. 16, 2005, incorporated herein by reference in its entirety.

BACKGROUND

This disclosure generally relates to haptic alerts, and more particularly, to active material based haptic alerts for alerting a driver and/or passenger of a condition.

Haptic-based alert systems are emerging in the marketplace to provide a signal to the drivers and/or occupants of a vehicle of various conditions that may occur in the forward, side (left and right), and rear directions. For example, it is known to provide vibrotactile devices and displacement devices to alert a driver of a potential impact event or to warn a driver when the vehicle drifts out of a designated lane. All of these haptic based alert systems utilize mechanical actuators such as solenoids, pistons, and the like that act in concert to provide the desired haptic alert. Conventional mechanical actuators are costly, their form factor is large, they have higher power consumption, and it is not a straightforward process to couple their output to the driver. Moreover, even when conventional mechanical actuators can be made to fit, their large form factor often modifies the normal shape and feel of the vehicle surfaces that the actuators are under. This can result in reduced comfort for the driver and passengers.

While these prior art haptic based systems can be adequate for their intended use, it is desirable to provide other types of systems that overcome some of the problems and response limitations inherent with the use of mechanical actuators.

BRIEF SUMMARY

Disclosed herein are active material based haptic alert systems and methods. In one embodiment, a haptic alert system comprises an active material in operative communication with a vehicle surface, the active material adapted to reversibly change at least one attribute in response to an applied activation signal, wherein the vehicle surface variously vibrates, displaces, changes stiffness, and/or exerts a force on a contacting portion of a person in contact with the vehicle surface with the change in the at least one attribute of the active material; and a controller in communication with active material, wherein the controller includes instructions to selectively apply the activation signal, wherein the vehicle surface has at least one property that changes with the change in the at least one attribute of the active material.

A method for alerting an occupant of a vehicle of a condition comprises producing an activation signal with an activation device; and applying the activation signal to an active material in operative communication with a vehicle surface and causing a change in at least one property of the active material, wherein the change in the at least one property is effective to vibrate, displace, and/or change a stiffness property to the vehicle surface.

The above described and other features are exemplified by the following figures and detailed description.

BRIEF DESCRIPTION OF THE DRAWINGS

Referring now to the figures, which are exemplary embodiments and wherein like elements are numbered alike.

DESCRIPTION OF THE PREFERRED EMBODIMENT

Figure 1:
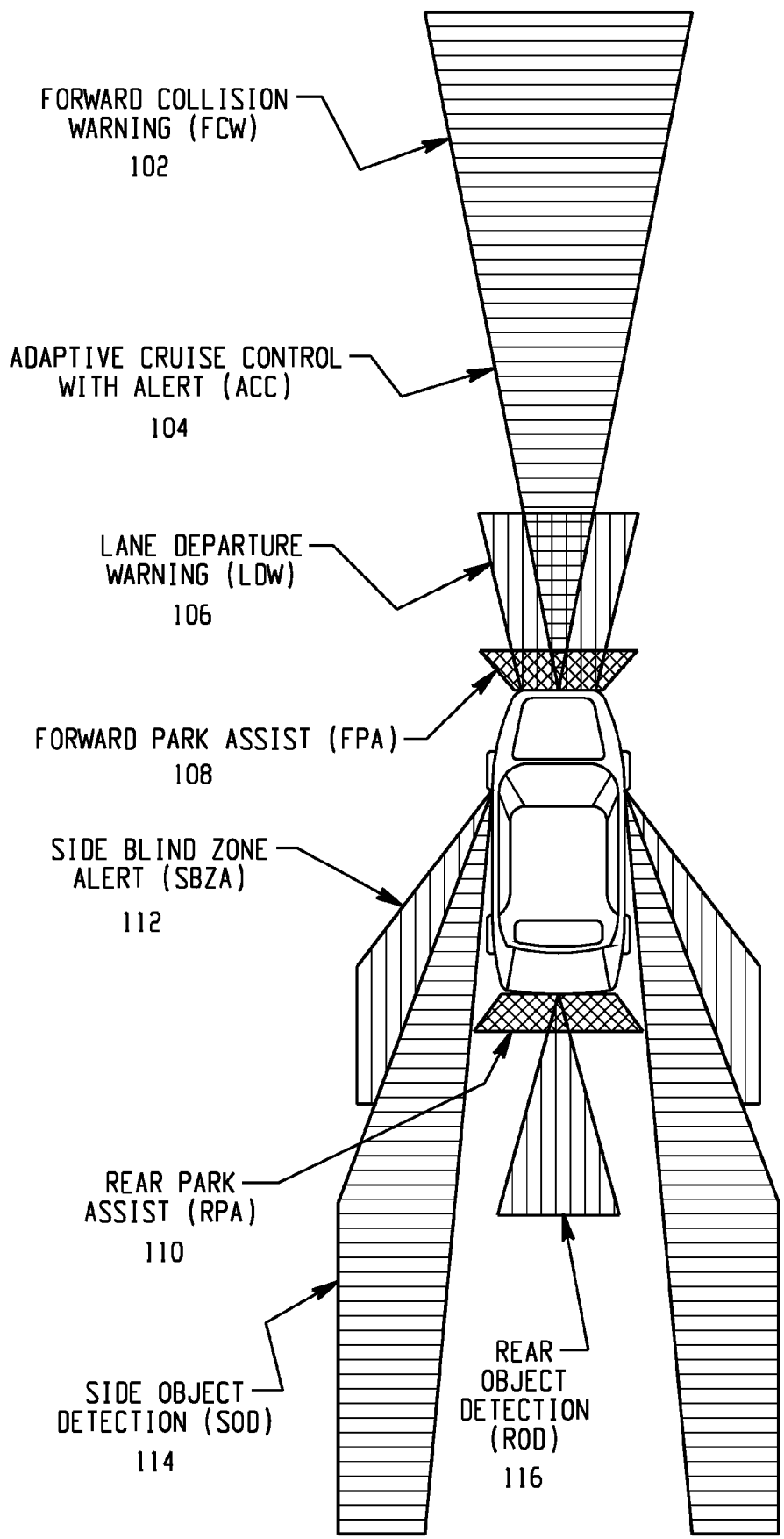
FIG. 1 is a schematic of the zone (or field of view) coverage for exemplary short range and long range collision warning/mitigation/avoidance systems which monitor threats in the forward, side and rear directions.

Exemplary embodiments provide integrated haptic collision alerts that supply timely information to a driver of a vehicle about the presence, urgency, and direction of potential collision threats. Alternative embodiments include haptic-based alerts for providing other information such as a vehicle condition to a driver such as alerting/awakening the driver of/from his drowsiness, alerting of excessive distraction from the driving function due to excessive workload (for example vibration intensity increase as workload factors such as cell phone use increase), alerting of the need to turn headlights on and/or the turn signal off, and alerting of the presence of a vehicle in one's blind spot for example when one activates the turn signal or starts to turn the wheel for a lane change, altering the driver to low fuel levels, and the like.

The systems described herein utilize active materials to provide the haptic-based alert. The use of active materials overcomes many of the disadvantages associated with the conventional mechanical-based actuators noted above. For example, the active material actuators eliminate the need for heavy, bulky and complicated mechanical actuators.

The term "active material" as used herein refers to several different classes of materials all of which exhibit a change in at least one attribute such as dimension, shape, and/or flexural modulus when subjected to at least one of many different types of applied activation signals, examples of such signals being thermal, electrical, magnetic, stress, and the like.

One class of active materials is shape memory materials. These materials exhibit a shape memory. Specifically, after being deformed pseudoplastically, they can be restored to their original shape by the application of the appropriate field. In this manner, shape memory materials can change to a determined shape in response to an activation signal. Suitable shape memory materials include, without limitation, shape memory alloys (SMA), ferromagnetic SMAs (FSMA), and shape memory polymers (SMP).

A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), two-way trained shape memory alloys, magnetorheological fluids and elastomers (MR), electrorheological fluids (ER), composites of one or more of the foregoing materials with non-active materials, combinations comprising at least one of the foregoing materials, and the like.

Depending on the particular active material, the activation signal can take the form of, without limitation, an electric current, an electric field (Voltage), a temperature change, a humidity change, a radiation exposure, a magnetic field, a mechanical loading or stressing, or the like. Of the above noted materials, SMA and SMP based assemblies preferably include a return mechanism to restore the original geometry of the assembly. The return mechanism can be mechanical, pneumatic, hydraulic, pyrotechnic, or based on one of the aforementioned smart materials.

Through the field activated change in the property of the active material in response to a sensor detect of a condition, the driver and/or occupants of the vehicle can be alerted to the presence of the condition and as a consequence take appropriate action to diminish the threat (or be informed of the condition, if the haptic based alert is so designed). Furthermore, for certain active materials the magnitude of the change in material property can be configured to be proportional to the magnitude of the applied field. Thus, in the case of at least some of the active materials, through differences in the magnitude and/or rate of application of the applied field, the imminence and/or severity of the detected condition can be communicated to the driver and/or occupants through differences in the size and quickness of the change in the property of the active material. Changes in the frequency of activation and in the amount of material activated could also serve this role. Additionally, changes in the location of the material that is activated could be used to communicate the direction of the condition.

The active material based devices employed for the haptic based alerts are more robust than strictly electromechanical approaches as they have no mechanical parts since it is the active material itself that transmits the haptic alert. The active material devices also, in almost all embodiments, emit neither acoustic nor electromagnetic noise or interference. Because of their small volume, low power requirements, and distributed actuation capability among other attributes, they can be embedded into the vehicle surface/components at various locations (or any other vehicle component as may be desired) and give feedback to the driver by, for example, vibration (time varying displacement/stiffness) of varying magnitudes and frequencies. For example, they can also be located in specific locations in the seat, the steering wheel, pedals, and the like, and actuated in a certain sequence or just in select locations to convey additional feedback to the driver for example as to direction of threat. Expanding on this, activation of just a section on the left side of the seat, for example, could indicate a condition from the left direction. Alternatively, activation in a certain sequence such as a "wave" moving from left to right across the seat could be another means of indicating the direction in which the condition is approaching. It is comprehended that differences in the frequency and/or amplitude of vibration could also be used to indicate the severity of the condition (such as an impending impact event). Changes in the frequency and/or amplitude of vibration with time could also be used to indicate a change in the probability or imminence of a condition from cautionary up through truly imminent. It is furthermore to be understood that the use of active materials as haptic feedback devices has potentially wide applications. Indeed, these devices can be used in conjunction with various sensor based convenience and safety systems such as park assist, collision warning, adaptive cruise control, lane departure warning, inattentive driver sensing system, drowsy driver sensing system, etc. Another advantage of using active materials for haptic feedback is that the level of warning given to the driver can be adjusted very easily by a simple controller. It is comprehended that this would permit personalization of for example magnitude, frequency, and location (in the seat) of the haptic feedback. It also would allow retuning/resetting of levels (again principally frequencies, amplitudes) with age and use of the active material based haptic device.

Suitable active materials for providing the actuation of the haptic based alert include piezoelectrics, electroactive polymers, magnetorheological fluids, electrorheologicalfluids, MR polymers, ferromagnetic shape memory alloys, magnetostrictives, SMA's (uni-morphs and bi-morphs), and shape memory polymers.

Piezoelectrics exhibit a small change in dimensions when subjected to an applied voltage. Their response is proportional to the strength of the applied field and is quite fast being capable of easily reaching the thousand hertz range. Because their dimensional change is small (<0.1%), to dramatically increase the magnitude of dimensional change they are usually used in the form of piezo ceramic unimorph and bi-morph flat patch actuators that are constructed so as to bow into a concave or convex shape upon application of a relatively small voltage. The rapid morphing/bowing of such patches within the seat or other tactile surface is eminently suitable for vibratory-tactile input to the driver.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

EAPs generally include a laminate structure of a pair of electrodes with an intermediate layer of low elastic modulus dielectric material. Applying a potential between the electrodes compresses the intermediate layer causing it to expand in plane. EAPs exhibit a response proportional to the applied field and can be actuated at high frequencies. EAP patch vibrators have been demonstrated and are suitable for providing the haptic-based alert such as for use in the seat or other tactile surface for vibratory input to the driver and/or occupants.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

MR fluids exhibit a shear strength that is proportional to the magnitude of an applied magnetic field. Changing the strength of the applied magnetic field could thus be used to change the stiffness of a region of the seat, this serving as the means of haptic alert. Property changes of several hundred percent can be effected within a couple of milliseconds in addition to step function property change input, in this case in terms of the stiffness of the seat. Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

ER fluids are similar to MR fluids in that they exhibit a change in shear strength when subjected to an applied field, in this case a voltage rather than a magnetic field. Changing the strength of the applied electric field could thus be used to change the stiffness of a region of the seat, this serving as the means of haptic alert. Response is quick and proportional to the strength of the applied field. It is, however, an order of magnitude less than that of MR fluids and several thousand volts are typically required.

Ferromagnetic SMA's exhibit rapid dimensional changes of up to several percent in response to (and proportional to the strength of) an applied magnetic field. Downsides are the fact that the changes are one-way changes and require the application of either a biasing force or a field reversal to return the ferromagnetic SMA to its starting configuration.

Magnetostrictives are solids that develop a large mechanical deformation when subjected to an external magnetic field. This magnetostriction phenomenon is attributed to the rotations of small magnetic domains in these materials, which are randomly oriented when the material is not exposed to a magnetic field. The shape change is largest in ferromagnetic or ferromagnetic solids. Terfinol D is the most thoroughly explored form of magnetostrictive. Positives in terms of use in haptic communication are their very high frequency capability, the fact that strain is proportional to the strength of the applied magnetic field, and that these materials return to their starting dimension upon removal of the field.

SMAs exhibit a modulus increase of 2.5 times and a dimensional change of up to 8% (depending on the amount of pre-strain) when heated above its martensite to austenite phase transition temperature. Embedded in the seat as a unimorph, bi-morph in wire and/or sheet form, these materials could be utilized to give haptic feedback to the driver and/or occupants in terms of both stiffness and/or dimensional changes. Because full thermal heating/cooling activation cycles require times on the order of seconds, effective and logical ways in which they might communicate haptically to the driver would be through step changes in properties or through step function increases in the size of the area of change/communication. Most SMA compositions function in one-way so that a biasing force return mechanism (such as a spring) would be required to return it (the SMA) to its starting configuration once the applied field is removed.

SMPs generally refers to a polymeric material, which exhibits a change in a property, such as an elastic modulus, a shape, a dimension, a shape orientation, or a combination comprising at least one of the foregoing properties upon application of a thermal activation signal. SMPs exhibit a dramatic drop in modulus/stiffness when heated above the glass transition temperature of that of their constituents that has a lower glass transition temperature. Because this is generally a thermally activated property change these materials are not well suited for rapid or vibratory haptic communication. If loading/deformation is maintained while the temperature is dropped, the deformed shape will be set in the SMP until it is reheated while under no load to return to its as-molded original shape.

In the exemplary embodiment described herein, vibration alerts in the seat pan of the driver's seat cushion can be utilized to inform the driver of the presence, urgency, and direction of potential collision threats. However, as previously discussed, active material based haptic alerts can be used in connection with alerting/awakening the driver of/from his drowsiness, alerting of excessive distraction from the driving function due to excessive workload (for example vibration intensity increase as workload factors such as cell phone use increase), alerting of the need to turn headlights on and/or the turn signal off, alerting of the presence of a vehicle in one's blind spot for example when one activates the turn signal or starts to turn the wheel for a lane change, low fuel levels, and the like.

Illustrative approaches are described below in which the seat vibration activity is mapped to the direction and urgency of a condition (and by implication, these approaches also indicate the presence of the condition). It will be appreciated that the exemplary approaches described herein can easily be extended to accommodate any current and future condition detecting system. In addition, it should be noted that the seat vibration alert approach may be combined with other warning sensory modalities (e.g., auditory, visual, haptic/tactile).

Referring herein to FIG. 1, a schematic example of the zone (or field-of-view) coverage for collision warning/mitigation/avoidance systems is provided. Examples of such systems include Forward Collision Warning (FCW) 102, Adaptive Cruise Control (ACC) 104, Forward Park Assist (FPA) 108, Lane Departure Warning (LDW) 106, Side Blind Zone Alert (SBZA) 112 (also referred to as a "blind spot system"), (longer range) Side Object Detection (SOD) 114 (also referred to as a "lane change alert system"), Rear Park Assist (RPA) 110, and (longer range) Rear Object Detection (ROD) 116 (also referred to as a "backing warning system"). Please note that these zones are not drawn to scale, and are intended for illustrative purposes only. Moreover, although not illustrated, it should be apparent to those skilled in the art that combination GPS and map based information, telematics, wi-fi, wireless vehicle to vehicle and vehicle to infrastructure communication means can also be used as inputs to identify the existence of a growing threat and should be included for the sake of completeness.

For the driver of a vehicle equipped with multiple avoidance systems (such as those shown in FIG. 1) that are monitoring different directions of conditions, alerts should be presented in a manner that allows the driver to quickly and accurately assess the direction and urgency of the condition. This will facilitate the ability of the driver to respond to the condition in a timely, effective, and appropriate manner to help in avoiding or in mitigating the condition. Appropriate driver responses to the alert may include braking, accelerating, and/or steering, or simply making no response in the case of a false alarm.

In the present example, there are three sensory modalities that can potentially be utilized to provide alerts to drivers in a timely and effective manner: visual, auditory, and haptic. Haptic alerts refer to any warning that is presented through the proprioceptive (or kinesthetic) senses, such as brake pulse deceleration/vehicle jerk, steering wheel vibration/pushback, or accelerator pedal vibration/pushback cues. Seat vibration alerts, a particular example of a haptic alerts, provide a robust method of warning drivers of the presence, direction, and urgency of a potential collision threat. Relative to visual collision alerts, haptic alerts, such as seat vibration alerts, offer the advantage that the driver does not need to be looking in any particular direction (e.g., toward the visual alert) in order to detect and respond appropriately to the collision alert. In this sense, similar to auditory alerts, haptic alerts, such as seat vibration alerts, can be viewed as essentially "omni-directional" in nature.

Relative to auditory alerts, haptic alerts, such as seat vibration alerts, may be more effective at indicating to the driver the direction of the condition. Variations in factors, such as the number and position of speakers, existence of rear speakers, occupant seat/eye/ear positioning, interior ambient noise, cabin architecture and materials, and objects and passengers inside the vehicle, suggest the tremendous complexities involved in presenting collision alert sounds in a manner that would allow the driver to quickly and accurately identify the condition direction from auditory collision alerts. In addition, relative to auditory alerts, haptic alerts, such as seat vibration alerts, are likely to be perceived as less annoying to drivers (and passengers) during false alarms since they do not interrupt ongoing audio entertainment. Note that this assumes that these systems will temporarily mute or at least reduce audio volume when auditory collision alerts are presented. Furthermore, unlike auditory alerts, seat vibration alerts would allow the driver to experience the alert "privately" (or discretely) without fear of criticism by passengers.

Relative to auditory and visual alerts, haptic alerts (of which seat vibration cues is one example) may be underutilized from a driver workload (or attention capacity) perspective, since it can be argued that drivers receive most of their information while driving via the visual and auditory modalities. In addition, relative to auditory and visual alerts, the implementation of haptic alerts (e.g., seat vibration alerts) appear to be less sensitive to vehicle-to-vehicle differences. These differences include the number and position of speakers (or speaker layout), existence of rear speakers, occupant positioning (including ear, eye, and head positioning), interior and exterior ambient noise, cabin architecture and materials, objects and passengers inside the vehicle, and the ability of the vehicle architecture to accommodate visual collision alert displays at a various locations. Further, haptic alerts appear to be less sensitive to within-driver and driver-to-driver variability than auditory and visual collision alerts. This variability includes changes in occupant positioning (including ear, eye, and head positioning) within and across driving trips, and differences in drivers' modality sensitivity/impairment. An example of the latter point is that older drivers commonly suffer impairments in both the visual and auditory modalities, whereas their ability to sense seat vibrations (and haptic alerts in general) are less likely to be impaired.

Hence, the use of haptic alerts, such as seat vibration alerts, increases the ability of a driver to properly use and intuitively understand multiple avoidance systems within their vehicle (as well as across vehicles), increases the avoidance/mitigation benefits afforded by these systems, and decreases the cost of these systems (in light of the robustness and lack of complexity advantages suggested above). The use of haptic alerts also allows automobile manufacturers to "pick and choose" any subset of available avoidance systems without compromising (via system interactions) the avoidance benefits afforded by these systems. More generally, utilizing haptic alerts, such as seat vibration alerts, may increase the deployment and effectiveness of avoidance systems.

An exemplary embodiment utilizes seat vibration as a haptic alert to indicate to the driver of a vehicle the presence, direction, and urgency of a condition in or about a vehicle equipped with a multiple avoidance (or warning) system as illustrated in FIG. 1. The driver experiences seat vibration alerts, or cues, through the seat cushion (bottom, or seat pan) portion of the driver's seat (e.g., via a matrix of vibrating elements embedded in the seat cushion), that is, where the driver's buttocks and back of their thighs contact the seat. In an alternate exemplary embodiment, other parts of the vehicle that a driver has direct contact with (e.g., the back of the seat, seatbelts, steering wheel, accelerator, brakes) are vibrated to warn of a potential condition. These examples are intended to be illustrative only, and should not be interpreted as boundaries for this scope of disclosure. Also note that the urgency of the condition in each of these examples may be manipulated in a straightforward manner (e.g., by changing the rate at which the seat is vibrated, the length of the vibration, or the intensity of the vibration).

Figure 2:
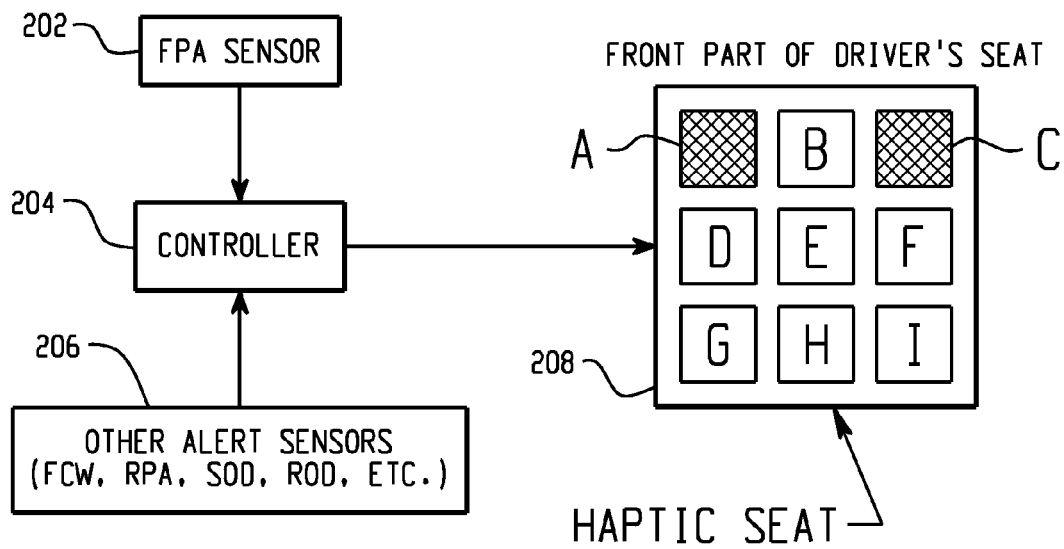
FIG. 2 is a system for providing haptic collision warning/mitigation/avoidance alerts in accordance with exemplary embodiments.

FIG. 2 is a system diagram for providing haptic avoidance alerts in accordance with the exemplary embodiments. In the example depicted in FIG. 2, a forward park assist (FPA)

sensor 202 is in communication with a controller 204. The FPA sensor 202 communicates to the controller 204 information about the location of objects ahead relative to the driver's vehicle. The controller 204 continuously evaluates information received from the FPA sensor 202 to determine if an object is closer than a selected threshold and hence, if the object poses a threat to the vehicle. If the alert algorithm located on the controller 204 determines that the driver should be warned of the threat, a haptic seat vibration warning is provided in the appropriate location(s) of a haptic seat 208. Also as shown in FIG. 2, data from other alert sensors 206 may also be input to the controller 204. In this manner, the sensor data from multiple avoidance systems may be collected by the controller 204 and utilized by the controller 204 to determine what haptic alerts to communicate to the driver of the vehicle. In the example shown in FIG. 2, the haptic alerts are provided to the driver via vibrations in matrix locations "A" and "C" on the driver's seat cushion in response to a threat (i.e., a condition) being located in front of the vehicle.

Any haptic method of communicating to the driver, as known in the art, may be implemented by exemplary embodiments of the present disclosure. For example, locations in the seat may pulse instead of vibrate. The vibrating and pulsing may occur at different speeds and/or intensities to indicate the urgency of the alert. Pulsing or vibrating could be accomplished through many devices, such as seat inflation bladders, or other vibration devices. In addition, other portions of the vehicle may be utilized to provide haptic alerts to the driver of the vehicle. Examples include the back of the seat, the accelerator and/or the steering wheel. Occupants of the vehicle may be provided with the haptic alerts (e.g., driving school vehicles equipped to alert instructors of collision threats). Combinations of various haptic methods and vehicle locations utilized to provide alerts may be implemented by exemplary embodiments of the present disclosure.

In an exemplary embodiment of the present disclosure, the area of the seat cushion that is vibrated is spatially mapped to the corresponding direction of the collision threat, as indicated below:

| Direction of Condition (Degrees offset from driver using 0° as straight ahead reference point) | General Area of Seat Cushion That is Vibrated |
| --- | --- |
| Forward-Straight Ahead (0°) | Front (A, C) |
| Forward-Left Side (−45°) | Front-Left (A) |
| Forward-Right Side (+45°) | Front-Right (C) |
| Side-Left of Vehicle (−90°) | Left Side-Center (D) |
| Side-Right of Vehicle (+90°) | Right Side-Center (F) |
| Rearward-Straight Back (180°) | Rear-Center (H) |
| Rearward-Left Side (−135°) | Rear-Left (G) |
| Rearward-Right Side (+135°) | Rear-Right (I) |

Figure 3:
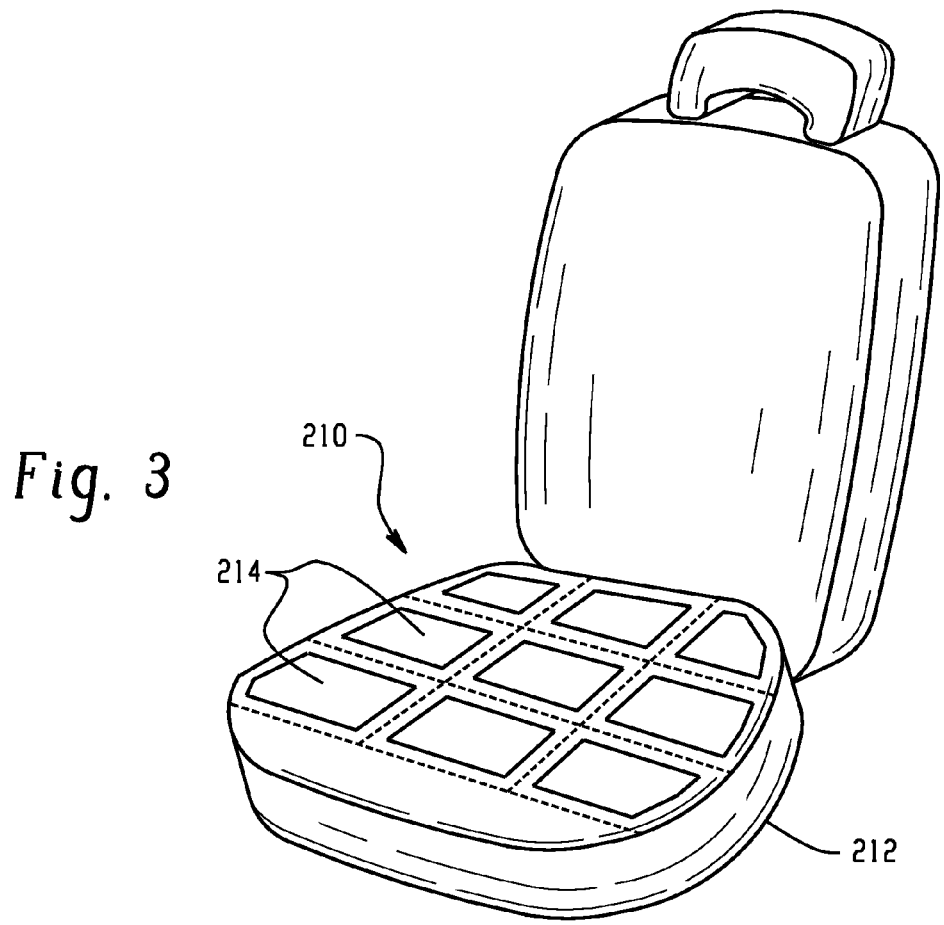
FIG. 3 illustrates example partitions in a seat cushion that may be utilized to provide haptic collision avoidance alerts in an exemplary embodiment.

In this example, seat vibration alerts corresponding to the four cardinal and four oblique directions in the haptic seat 208 are represented. The letters in parenthesis represent the partition, or matrix, locations as labeled in the haptic seat 208 illustrated in FIG. 2. A picture of a seat pan portion 210 of a seat cushion 212 with the partition locations marked is depicted in FIG. 3. Within each section an active material actuator can be disposed in operative communication with seat surface to provide seat vibrotactile sensation to the seat occupant. For example, a piezoelectric patch 214 can be disposed within the seat cushion and in close proximity to the seat surface.

An alternative exemplary embodiment is similar to the previously discussed embodiment, with the exception that the directional seat vibration alert (as defined in the above table) is preceded by an initial "master" seat vibration alert which will occur in the center portion of the seat. The purpose of this master alert is to first notify the driver of the presence of a threat or condition, to provide a frame of reference for which the subsequent directional seat vibration alert can be perceived, and to create the perception of apparent motion toward the direction of the threat. This added frame of reference might allow the driver to more quickly and effectively identify the direction of the threat.

As described above, the embodiments described herein may be embodied in the form of computer-implemented processes and apparatuses for practicing those processes. Embodiments may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although specific reference has been made to vibration of seats, other haptic alerts utilizing active materials include varying pedal resistance, massaging functions, and the like.

Figure 4:
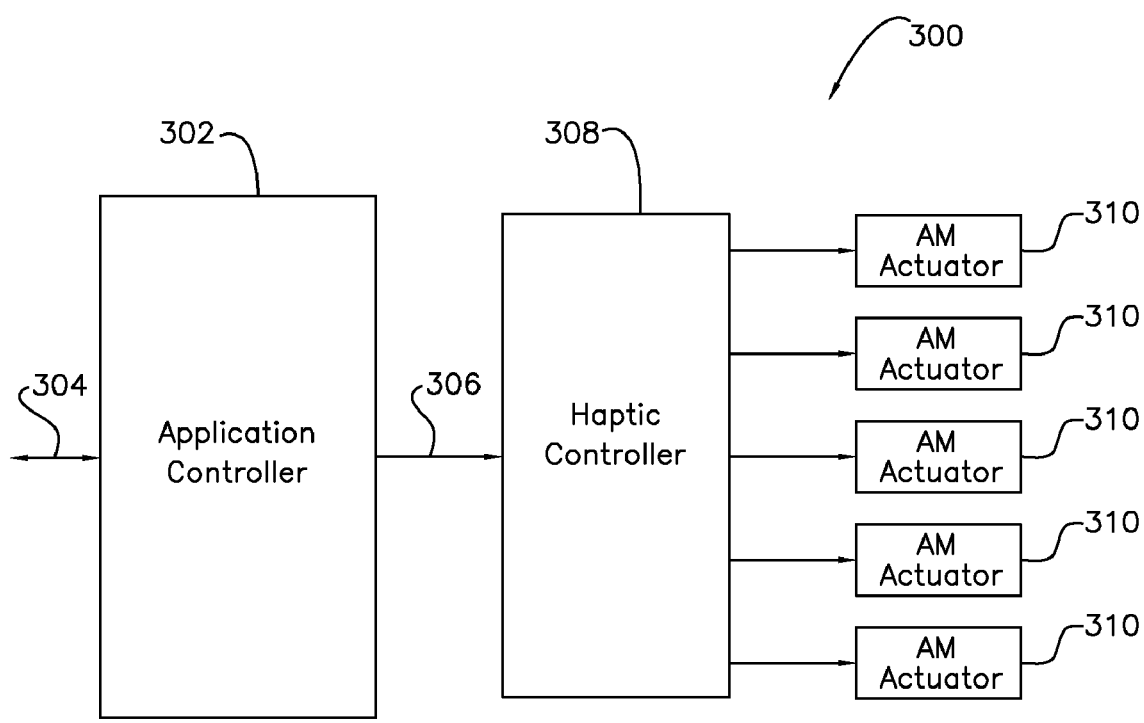
FIG. 4 schematically illustrates a block diagram of an exemplary active material based haptic alert system.

FIG. 4 schematically illustrates a block diagram of an exemplary active material based haptic alert system 300. The system 300 includes application controller 302 having an interface 304 with the vehicle. The application controller 302 can be configured to provide a variety of alert applications, such as but not limited to, collision avoidance, parking assist, lane departures warning, fatigued driver warning, adaptive cruise control and the like. The application controller 302 provides a signal via a haptic control interface 306 to a haptic controller 308 so as to activate the active material by activating one or more active material based actuators 310 in operative communication with the desired vehicle surface, e.g., vehicle seat.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A haptic alert system adapted for alerting a person within a vehicle to a condition, said system comprising:
   an active material in operative communication with a vehicle surface, and operable to reversibly change at least one attribute in response to an applied activation signal, wherein the surface variously vibrates, displaces, changes stiffness, or exerts a force upon the person when the person is in contact with the surface, as a result of the change in the at least one attribute of the active material; and a controller in communication with the active material, wherein the controller is operable to determine the condition, and includes instructions to selectively apply the activation signal, when the condition is determined.

2. The system of claim 1, wherein the at least one attribute undergoing reversible change is a dimension, a shape, a shear force, a shape orientation, a flexural modulus, a phase of matter, or a combination comprising one or more of the foregoing properties.

3. The system of claim 1, wherein the active material is a shape memory alloy, a ferromagnetic shape memory alloy, a shape memory polymer, a magnetorheological fluid, an electroactive polymer, a magnetorheological elastomer, an electrorheological fluid, a piezoelectric material, or a combination comprising at least one of the foregoing active materials.

4. A method for alerting an occupant of a vehicle of a condition, the method comprising:
   determining the condition;
   producing an activation signal with an activation device; and
   applying the activation signal to an active material in operative communication with a vehicle surface and causing a change in at least one property of the active material, wherein the change in the at least one property is effective to vibrate, displace, or change a stiffness property to the vehicle surface, when the condition is determined.

5. The method of claim 4, wherein producing the activation signal comprises detecting a condition with selected one of a sensor, a combined GPS/map based, or a telecommunication means.

6. The method of claim 4, wherein the vehicle surface comprises a brake pedal, a steering wheel, a seat, an accelerator, a floor, an arm rest, a console, and combinations comprising at least two or more of the foregoing vehicle surfaces.

7. The method of claim 4, wherein producing the activation signal comprises sensing an impact event or pre-impact event.

8. The method of claim 4, wherein the activation signal is a thermal activation signal, a magnetic activation signal, an electric activation signal, a chemical activation signal, or a combination comprising at least one of the foregoing activation signals.

9. The method of claim 4, wherein the active material is a shape memory alloy, a ferromagnetic shape memory alloy, a shape memory polymer, a magnetorheological fluid, an electroactive polymer, a magnetorheological elastomer, an electrorheological fluid, a piezoelectric material, or a combination comprising at least one of the foregoing active materials.

10. The method of claim 4, wherein the change in at least one property is a dimension, a shape, a shear force, a shape orientation, a flexural modulus, a phase of matter, or a combination comprising one or more of the foregoing properties.

11. The method of claim 4, wherein the change in the at least one property is effective to vibrate, displace, or change the stiffness of selected portions of the vehicle surface.

12. The method of claim 11, wherein vibrating, displacing, or changing the stiffness of the selected portions provides a directional indication of a condition.

13. The method of claim 4, further comprising increasing a vibration frequency, a vibration amplitude, the size of the area of vibration or a combination of the vibration frequency, amplitude, and area in response to an increase in probability of an occurrence of a sensed condition.

* * * * *